INVENTORS
FRED R. COHRS
WILLIAM RALPH SMITH
BY
ATTORNEY

INVENTORS
FRED R. COHRS
WILLIAM RALPH SMITH
BY
ATTORNEY

Jan. 17, 1961  F. R. COHRS ET AL  2,968,090
TURRET TYPE ARTICLE HANDLING MACHINE
Filed April 5, 1957  7 Sheets-Sheet 6

INVENTORS
FRED R. COHRS
WILLIAM RALPH SMITH
BY
ATTORNEY

Jan. 17, 1961 F. R. COHRS ET AL 2,968,090
TURRET TYPE ARTICLE HANDLING MACHINE
Filed April 5, 1957 7 Sheets-Sheet 7

STATION B

INVENTORS
FRED R. COHRS
WILLIAM RALPH SMITH
BY
ATTORNEY

United States Patent Office 2,968,090
Patented Jan. 17, 1961

2,968,090

TURRET TYPE ARTICLE HANDLING MACHINE

Fred R. Cohrs, Vicksburg, and William Ralph Smith, Kalamazoo, Mich., assignors to The Upjohn Company, Kalamazoo, Mich., a corporation Filed Apr. 5, 1957, Ser. No. 651,017

12 Claims. (Cl. 29—240)

This application relates in general to an article handling machine and it relates particularly to a type thereof for receiving tubular containers onto successive mandrels or groups of mandrels, each of said containers normally carrying a screw-type cap thereon, tightening said caps and presenting the containers to a labeling machine for application of a desired label to each of said tubular containers.

A previous application, namely, Serial No. 546,507, filed November 14, 1955, now Patent No. 2,791,317, and assigned to the assignee of the present application, disclosed and claimed a machine for receiving tubular articles, such as medicine containers, and presenting them to a labeling machine of the type manufactured and sold by New Jersey Machine Company, Hoboken, New Jersey, under the name "Pony Labelrite." The machine of Serial No. 546,507 has worked satisfactorily for the purposes therein intended and experience with said machine has established the principles thereof as being sound. However, in a continuous effort to provide better apparatus for handling such articles, certain points have been observed at which said previous machine could be improved. Since the machine of said previous application has no counterpart in the industry, insofar as we know, it is believed that improvements made over said machine will also be unique in the industry.

More specifically, the machine of Serial No. 546,507 provided a station at which caps could be tightened on the containers, but it relied upon manual tightening of such caps if any tightening at all was done, and provided no specific mechanism for doing so. The present machine provides both the station and specific mechanism by which caps previously applied to the containers can be tightened thereon immediately prior to the labeling operation.

In providing such cap tightening mechanism, an unexpected problem was encountered. The previous machine provides for simultaneous rotation of all of the mandrels whenever any one, or any group of them is rotated, namely whenever a label applying operation is carried out. Since this occurs when the mandrel carrying turret is in non-rotative condition, it will necessarily also result that the mandrels rotate at the place and time when the cap tightening step is to be carried out. While theoretically the caps could be held stationary and the containers rotated into said caps, and this was tried, it was found as a practical matter that the containers tended to slip on, and with respect to, the mandrels and that to provide specific holding means for such containers on rotating mandrels was undesirably complex. Further problems, including the speed and timing of the mandrel rotation further complicated this attempt to rotate the containers and hold the caps. Accordingly, it became necessary, in order to utilize mechanically the cap tightening station, to provide means by which the mandrels at the tightening station would not only be released from rotation during a stationary condition of the mandrel carrying turret, but would be positively held against such rotation, in order to permit the tightening of caps thereon by a cap rotating-type of cap tightening device.

A further problem, encountered in improving the apparatus of application Serial No. 546,507, arose from the desire to use twin mandrels at each position on the rotative turret in order to improve the productive capacity of the equipment. However, when twin mandrels were used, it became essential that the absence of a container on either mandrel of a given pair would be effective to actuate mechanism provided to control the labeling machine in such a manner as to prevent the presentation of a label by the labeling machine to either one of any pair of mandrels which at any given time fails to have a container on both mandrels. To do otherwise is not only wasteful of labels, but worse, it may often apply a label tightly around the mandrel not carrying a container and require a shutdown of the machine for manual removal of such label from said mandrel. Therefore, a different type of inspection means had to be provided which would be individually sensitive to the lack of a container on either of the twin mandrels at a given station and which would then appropriately control the labeling machine.

Other problems relating to smoothness of operation, accuracy of operation, minimizing of maintenance, better control of starting and stopping functions and better control of inertia all were considered and incorporated into the present improved machine.

Accordingly, the objects of the present invention have been:

(1) To provide a container handling machine for tightening caps on precapped containers and presenting them, either successively or in groups, to a labeling machine for application of a label to each of said containers.

(2) To provide a machine of the type above designated having cap tightening means at one station thereof.

(3) To provide a container handling machine of the type above designated which is so arranged that the container supporting mandrels are held in non-rotative condition at the cap-tightening station, to facilitate the tightening of preapplied, rotative-type caps thereto, such as screw-type caps or bayonet-slot type caps.

(4) To provide a container cap-tightening and presenting machine of the type above designated utilizing multiple mandrels at each position on a mandrel carrying turret.

(5) To provide a container cap-tightening and presenting machine, as aforesaid, having multiple mandrels at each location on a mandrel carrying turret and having also inspection means sensitive to the improper absence of a container on any one of a given group of multiple mandrels at a selected inspection point prior to the label receiving station, wherein said inspection means are sensitive to the absence of a container on any one mandrel of said given group of mandrels irrespective of the presence of such a container on another of said given group of mandrels.

(6) To provide a container cap-tightening and presenting machine of the type aforesaid permitting convenient visual inspection of the operation of the machine at all times.

(7) To provide a container cap-tightening and presenting machine of the type aforesaid having smoother starting and stopping characteristics than have been available in previously known equipment of this general type.

(8) To provide a container cap-tightening and presenting machine of the type aforesaid which has better control over inertia forces than has been previously known in apparatus of this general type.

(9) To provide a container cap-tightening and presenting machine of the type aforesaid which is sufficiently rugged to operate reliably under production line conditions for a long period of time without requiring special maintenance.

(10) To provide a container cap-tightening and presenting machine of the type aforesaid which is of sufficient simplicity that it can be kept in good operating condition by ordinary maintenance personnel.

(11) To provide a container cap-tightening and presenting machine of the type aforesaid which, although specifically designed for operation with a labeling machine manufactured and sold as "Pony Labelrite" by New Jersey Machine Company, Hoboken, New Jersey, is of such design that it can be readily modified to operate with other labeling machines of the same general type.

(12) To provide a container handling machine, as aforesaid, which can take its major power from the labeling machine and will therefore operate in an exactly timed relationship therewith and without the necessity of relying upon a major power source of its own.

(13) To provide a container handling machine, as aforesaid, which will require a sufficiently small amount of power to operate that it can be operated from the mechanism of an associated labeling machine, in the manner above mentioned without placing an undue load upon said labeling machine.

(14) To provide a container handling machine, as aforesaid, which will be equally adaptable to hand feeding of containers onto its mandrels at the receiving station or to the feeding thereof by automatic mechanical means.

(15) To provide a container handling machine, as aforesaid, wherein the cap tightening function can be carried out by any convenient cap tightening device, cooperating with the machine of the present invention, and including means for holding the containers stationary and non-rotatively in position for permitting operation of the cap-tightening mechanism.

Other objects and purposes of the invention will become apparent to persons familiar with this type of equipment upon reading the following specification and examining the accompanying drawings, in which:

Figure 7 is a sectional view taken along the line VII—VII of Figure 6.

Figure 1:
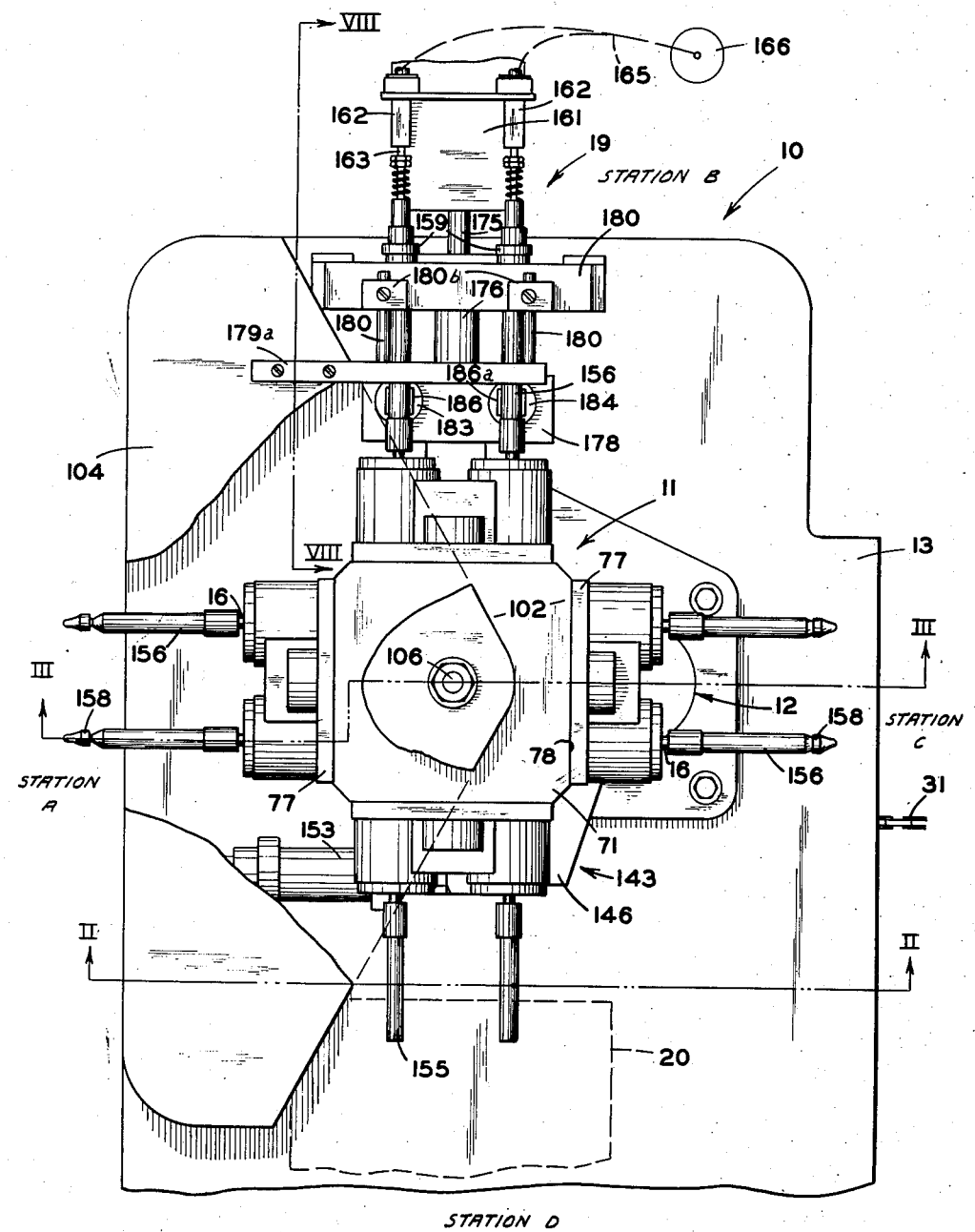
Figure 1 is a broken, top view of an article handling machine characterizing the invention.
Figure 2:
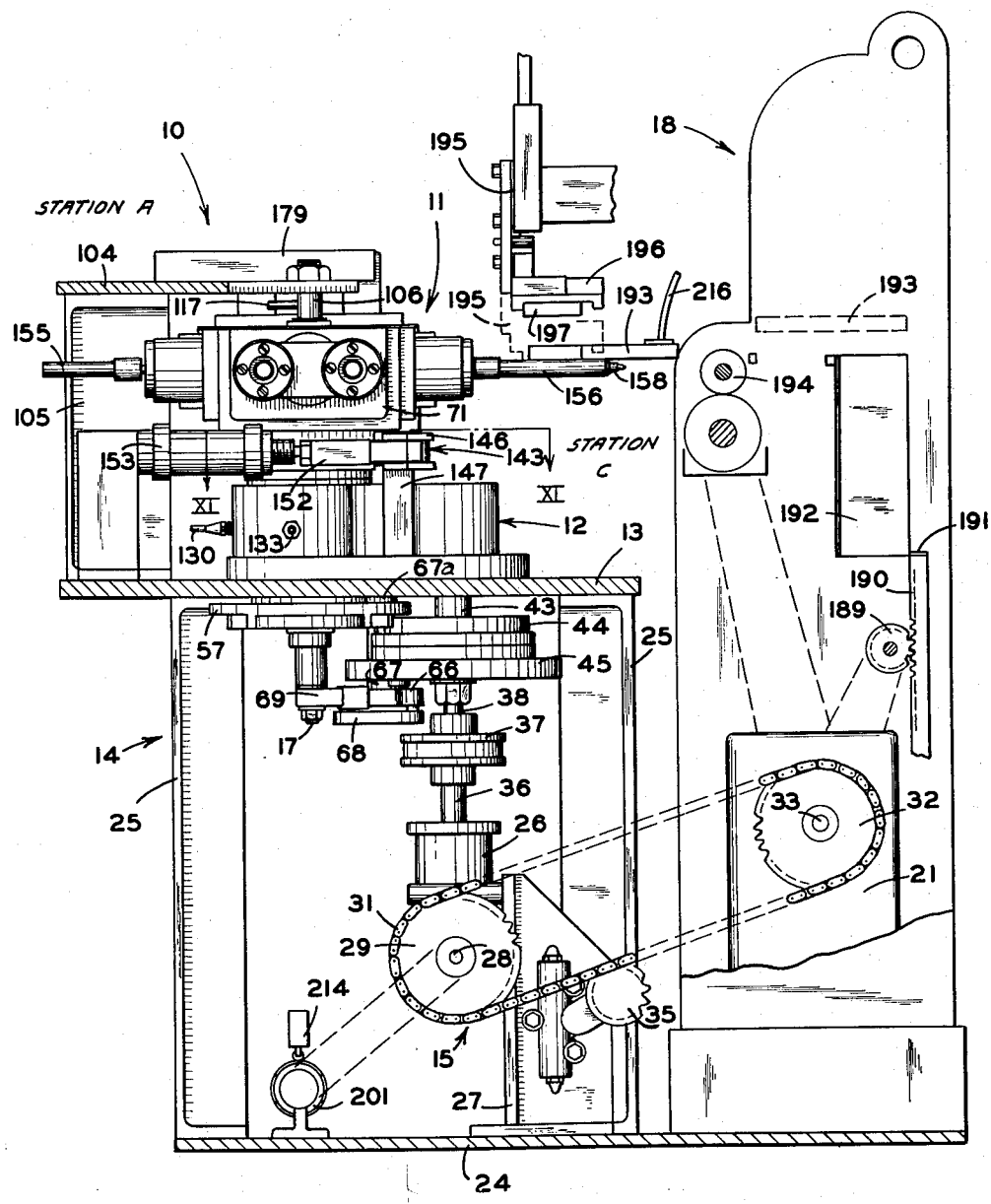
Figure 2 is a sectional view substantially as taken along the line II—II of Figure 1, and including a side elevational view of a portion of a label applying machine operable with said article handling machine.
Figure 3:
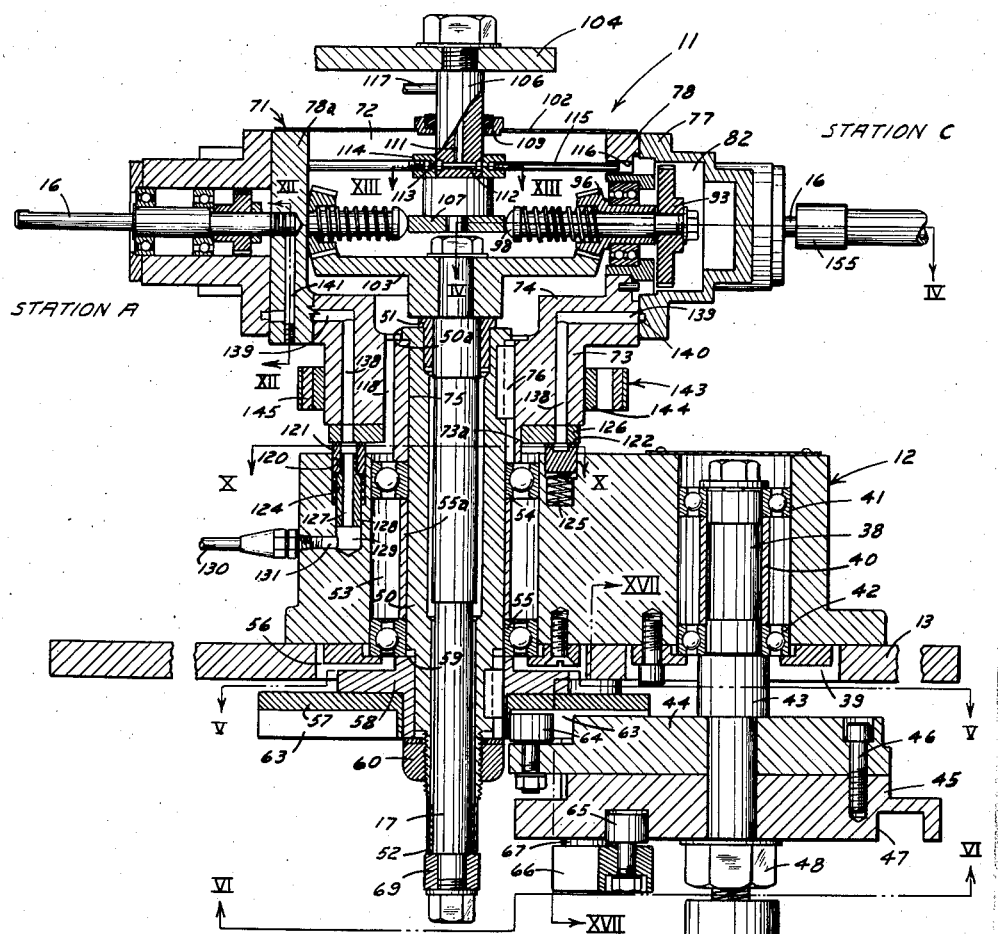
Figure 3 is a sectional view taken along the line III—III of Figure 1.

For purposes of convenience in description but having no limiting significance whatever, the terms "upper," "lower," and similar words denoting direction or position, will have reference to the article handling machine and parts associated therewith in their normal position of operation, as shown in Figures 2 and 3. The terms "front," "rear," and derivatives thereof, will have reference to the left and right sides, respectively, of the machine as appearing in Figures 1 and 2, the machine operator frequently occupying a position along the front side of said machine. The terms "inner," "outer," and derivatives thereof, will have reference to the geometric center of said article handling machine and parts thereof. The terms "rightward" and "leftward," and derivatives thereof, will be freely used in connection with various figures of the drawings and will refer to such directions with respect to the drawings in the normal position of observation. For further convenience, particularly in describing the operation of the machine, the following operational stations are designated as they appear in Figure 1; the loading station "A"; the cap tightening and inspection station "B"; the labeling station "C"; and the discharge station "D."

*General description*

In order to meet the above mentioned objects and purposes of this invention, as well as others relating thereto, there has been provided an article handling machine 10 (Figures 1 and 2) having a turret head 11 rotatably supported upon a pedestal 12 which is in turn mounted upon the top plate 13 of a frame structure 14 which latter houses the drive mechanism 15 by means of which said turret head 11 is rotated about a substantially vertical axis. A plurality of mandrels 16 are rotatably mounted upon the turret head 11 and extend radially therefrom with respect to the rotational axis thereof. Said mandrels are driven by said drive mechanism 15 operating through mechanical linkage including the drive shaft 17, which is rotatably supported within, and co-axially with respect to, both said turret head 11 and said pedestal 12.

In this particular embodiment of the invention, there are eight mandrels 16 arranged in four parallel pairs spaced at approximately 90 degree intervals around the axis of said turret head 11, the axes of said spindles lying substantially within the same horizontal plane. The drive mechanism 15, as will appear hereinafter, is arranged and constructed so that the pairs of mandrels are intermittently and simultaneously indexed or moved unidirectionally about the axis of the turret head 11 from one of the above mentioned stations to the next during the normal operation of the machine.

The label applying machine 18 (Figure 2), which is located adjacent to the labeling station "C" on the rear side of the machine 10, is driven by means, such as the motor 21, which also actuates the drive mechanism 15, thereby positively coordinating the operation of the two machines. A cap tightening apparatus 19 is mounted upon the frame structure 14 at the cap tightening station "B." However, it will be recognized that no particular type of either label applying machine 18 or cap tightening apparatus 19 is essential to the basic concept of the invention and these units are disclosed primarily for the purpose of illustrating the operation of the machine characterizing the invention. The receptacle 20 may be placed at the station "D" for receiving labeled articles.

*Detailed construction*

As shown in Figure 2, the frame structure 14 is comprised of the said top plate 13, a base plate 24 and a plurality of upright legs 25 which extend between, and are secured to, said top plate 13 and base plate 24, which latter may be a floor. The base plate 24 extends rearwardly of the top plate 13 to support the label applying machine 18 and thereby fix its position with respect to the frame structure 14 of the article handling machine 10. In this particular embodiment of the invention, the drive mechanism 15 includes a gear box 26 which is supported by means of the bracket 27 upon the base plate 24 beneath the top plate 13. Said gear box 26 has a horizontal input shaft 28 upon which a sprocket 29 is mounted for engagement by a chain 31 connected to a sprocket 32 which is supported upon, and driven by, any desired means which is positively coordinated with the operation of the labeling machine, but preferably the main drive shaft 33, which is in any convenient manner driven by the motor 21. An idler sprocket 35 is adjustably supported upon the bracket 27 for maintaining proper tension in the chain 31.

Figure 6:
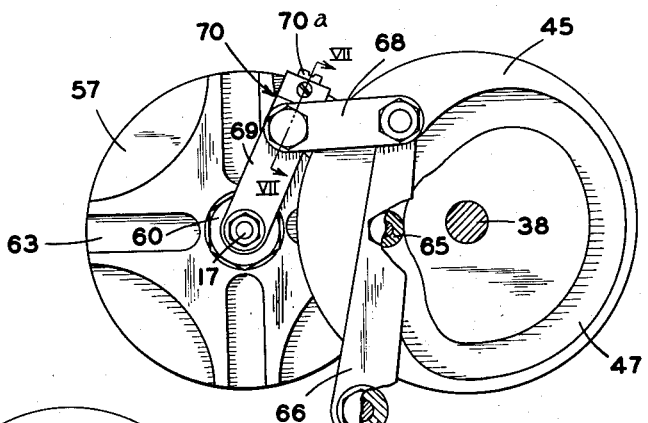
Figure 6 is a broken, sectional view taken along the line VI—VI of Figure 3.
Figure 5:
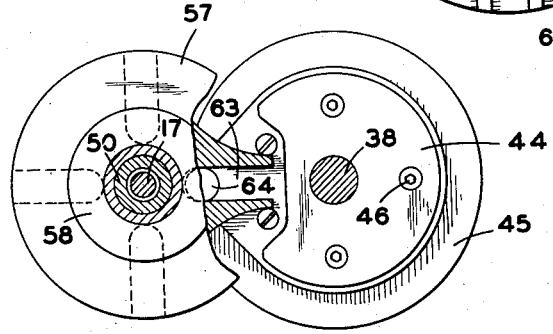
Figure 5 is a broken, sectional view taken along the line V—V of Figure 3.

The gear box 26 (Figure 2) is provided with a substantially vertical output shaft 36 which is connected by means of the coupling 37 to a vertical cam shaft 38 (Figure 3), the upper end of which extends through an appropriate opening 39 in the top plate 13 and is rotatably supported by the bearings 41 and 42 within the pedestal 12, said bearings being separated by the spacer 40. Said cam shaft 38 is provided with an integral collar 43 which is disposed just below the lower bearing 42. A Geneva driver 44 (Figures 3 and 5) is mounted upon the shaft 38 just below the collar 43. A cam wheel 45 (Figures 3 and 6) is mounted upon said cam shaft 38 just below the Geneva driver 44, and is secured to said Geneva driver 44 by means of the bolts 46. Said cam wheel 45 has a cam track 47 in its lower axial surface. The lower end of the cam shaft 38 is threaded for reception of a nut 48 whereby the Geneva driver 44 and cam wheel 45 are snugly held against the collar 43 for positive rotation with the cam shaft 38.

As shown in Figure 3, the drive shaft 17 extends from a point above the pedestal 12 down through said pedestal and the top plate 13 to a point below said top plate 13. Said drive shaft 17 is rotatably supported within a drive sleeve 50 by means of bearings 51 and 52 located at the upper and lower ends, respectively, of said sleeve 50. The lower bearing 52 is preferably of the pre-packed, self lubricating type, whereby the lower end of the passageway between the shaft 17 and sleeve 50 may be closed for reasons appearing hereinafter. Said sleeve 50, which is rotatably supported within the vertical opening 53 through the pedestal 12 by means of the bearings 54 and 55, extends upwardly above said pedestal and downwardly through an opening 56 in the top plate 13 to a point which is preferably somewhat below the cam wheel 45.

A Geneva wheel 57 (Figures 3 and 5) has a hub 58, which is keyed upon, hence rotatable with, the drive sleeve 50 near the lower end thereof. A nut 60, threadedly engaging the lower end of the sleeve 50, holds the sleeve assembly together by urging the Geneva wheel 57 against the lower end of the bearing 55, the force of which urging then passes through the spacer 55a, the bearing 54, the hub 73 (hereinafter described in more detail) to the flange 50a and thence back through the sleeve 50 to the lower end thereof. The Geneva wheel 57 is provided with a plurality, here four, of grooves 63 (Figures 3 and 6) in a conventional manner for engagement by the roller 64 on the Geneva driver 44.

Figure 17:
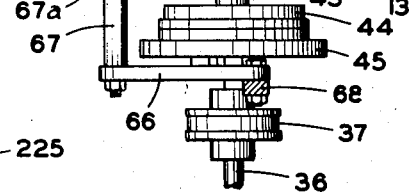
Figure 17 is a sectional view substantially as taken along the line XVII—XVII of Figure 3 and showing a detail of the machine.

A cam roller 65 (Figures 3 and 6), which is received within the cam track 47 in a substantially conventional manner, is rotatably supported upon the upper surface of the horizontal lever arm 66 between the ends thereof. One end of said lever arm 66 is pivotally mounted upon the lower end of a pivot post 67 which (Figures 2, 3 and 17) extends through a clearance opening in top plate 13 and is secured, as by means of the flange 67a (Figure 17) at its upper end, to the lower surface of the pedestal 12. The other end of the lever arm 66 is pivotally connected to one end of a link bar 68 (Figures 2 and 6), the other end of which is pivotally and adjustably supported upon the drive shaft actuating arm 69. Said actuating arm 69 is secured to said shaft 17 for rotation therewith. Accordingly, because one end of the lever arm 66 pivots about a point which is relatively fixed with respect to the axis of the drive shaft, pivotal movement of the lever arm 66, resulting from rotation of the cam wheel 45, will operate through the link bar 68 and actuating arm 69 to produce a corresponding pivotal movement of the drive shaft 17.

As shown in Figures 1, 2 and 3, the turret head 11 is comprised of a rectangular, central housing 71 having an upwardly opening cavity 72 and a support hub 73 extending downwardly from the bottom wall 74 of said housing 71. A central opening 75 is provided through the hub 73 and bottom wall 74 to communicate with the cavity 72. The upper end of the drive sleeve 50 is within the central opening 75 and is held therein for effecting rotation of said turret by means such as the key 76. The lower axial end of the hub 73 has a co-axial extension 73a of reduced diameter which is received into the opening 53 in the pedestal 12 and supported upon the inner race of the upper bearing 54.

A plurality, here four, of mandrel housings 77 (Figure 1) are secured, as by bolting, to the external surface of the side wall 78 of the central housing 71 at selected intervals therealong. The four mandrel housings 77 may be, and preferably are, substantially identical and uniformly spaced around the central housing 71. Thus, one of said mandrel housings 77 will be described in detail hereinafter and such description will be understood to apply in substance to all of said mandrel housings 77, unless specifically stated to the contrary. Such description will also include a mandrel 16 and parts associated therewith for rotatably supporting and driving said mandrel 16 within said mandrel housing.

Figure 4:
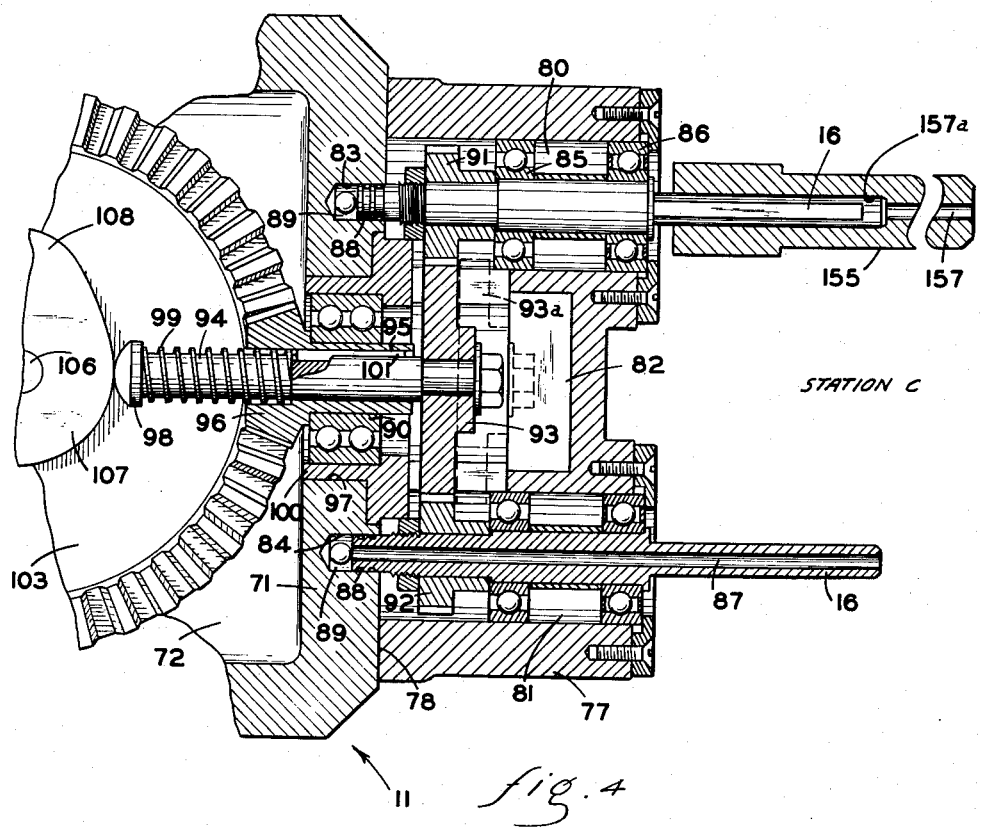
Figure 4 is a sectional view taken along the line IV—IV of Figure 3.

As shown in Figure 4, the mandrel housing 77 has a pair of horizontally spaced cylindrical chambers 80 and 81 which communicate with the opposite ends of a connecting chamber 82. The end wall 78 of the central housing 71 is provided with a pair of cylindrical recesses 83 and 84 (Figure 4) which respectively and coaxially communicate with the mandrel chambers 80 and 81. A pair of mandrels 16 are each rotatably supported by means of a pair of bearings 85 and 86 within, and extend outwardly and rightwardly (Figure 4) through the ends of, the mandrel chambers 80 and 81. Each said mandrel also extends leftwardly (Figure 4) into its corresponding recess 83 and 84, while leaving a pocket 89 between the leftward end of the mandrel and the blind end of said recess. Sealing rings 88 are provided around the leftward, or inner, ends of the mandrels 16 for appropriate sealing engagement with the adjacent wall of said openings 83 and 84. Each mandrel is provided with a central, preferably coaxial, passageway 87 which communicates with the pocket 89 in said recesses 83 and 84. Pinions 91 and 92 are mounted upon, and rotatable with, the mandrels 16 near the end wall 78 of the housing 71.

A gear 93, which is located within the connecting chamber 82, engages the pinions 91 and 92 in a conventional manner for driving same as shown in Figure 4. Said gear 93 is mounted upon and rotatable with the outer end of a shaft 94 which is axially slidably supported on, and non-rotatably with respect to, the elongated hub 95 of the bevel pinion 96. Said hub 95 extends through, and is rotatably supported within, a bearing 90 mounted in sleeve 100 which is in turn mounted in the opening 97 in the side wall 78 of the central housing 71, the pinion 96 being disposed within the cavity 72. The inner end of the shaft 94 is provided with an enlarged head 98 spaced from the pinion 96. Resilient means, such as the spiral spring 99, encircles the shaft 94 and is held under compression between said head 98 and the bevel pinion 96, for reasons appearing hereinafter.

The connecting chamber 82 is sufficiently large to permit axial movement of the gear 93 outwardly from the side wall 78 to a point where, as indicated in broken lines at 93a in Figure 4, it is disengaged from the pinions 91 and 92. The key 101 permits axial movement of the shaft 94 with respect to the hub 95 while preventing rotation therebetween. The teeth on the bevel pinion 96 are continuously engaged by the teeth of a bevel gear 103 (Figures 3 and 4) which is secured to, and rotatable with, the upper end of the drive shaft 17 within the cavity 72 of the central housing 71. A cover plate 102 is removably mounted upon the housing 71, thereby enclosing the cavity 72.

As appearing in Figures 1 and 2, a cam support plate 104 is mounted upon and above the top plate 13 by means such as the support legs 105 so that said support plate extends across a substantial portion of the upper surface of the turret head 11. As shown in Figure 3, a cam support post 106, which is coaxial with the turret head 11, is secured to and extends downwardly from said support plate 104 through a central opening 109 in the cover plate 102 and into the cavity 72. A horizontal cam 107 having a single lobe 108 (Figure 4) is secured to the lower end of the support post 106 so that it is aligned with, and engageable by, the heads 98 on the several shafts 94 extending from each of said spindle housings 77 into the cavity 72. In this particular embodiment, the cam 107 is disposed so that the lobe 108 thereof extends directly toward the cap tightening station "B." Thus, as each spindle housing 77 is moved into the cap tightening station "B," and while it occupies such station, its gear shaft 94 will be urged outwardly, against the contrary urging of the spring 99, to effect a disengagement between its gear 93 and its corresponding pinions 91 and 92. The purpose of such disengagement will become apparent hereinafter.

Figure 13:
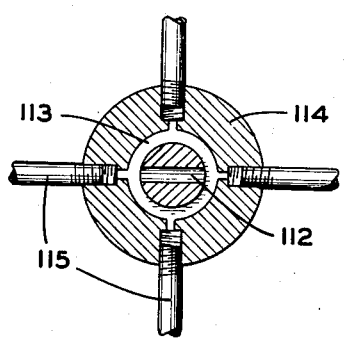
Figure 13 is a sectional view taken along the line XIII—XIII of Figure 3.

The support post 106 is provided with a coaxial, vertical passageway 111 (Figure 3) and a transverse passageway 112 (Figure 13) communicating between the lower end of said vertical passageway 111 and an annular groove 113 in said post 106. A distributor ring 114 encircles, and is rotatably supported on, the support post 106 so that it completely embraces the annular groove 113 therein. Four tubes 115 are mounted at uniform intervals in, and extend radially into, the distributor ring 114 where they communicate with the annular groove 113. The outer ends of said tubes 115 extend through suitable openings 116 in the side wall 78 of the central housing 71 where they communicate with the connecting chamber 82 within the spindle housing 77.

The upper end of the vertical passageway 111 is connected to a lubrication inlet pipe 117 (Figures 2 and 3). A lubrication passage 118 extends through the hub 73 between the cavity 72 and the lower end of the hub where it communicates with the opening 53 in the pedestal 12. A lubrication outlet pipe 119 (Figure 8) extends radially through the pedestal 12 and communicates with the opening 53 therein. Thus, lubricating materials, such as a fog of oil suspended in air, can be blown into the pipe 117 (Figure 3), thence through the post 106 and the pipes 115 to and through the chamber 82 and the cavity 72, thence downwardly through the opening 53 and out the outlet pipe 119.

The upper surface of the pedestal 12 (Figure 3) is provided with an annular recess 120 into which a sealing ring 121 (Figure 10) is snugly but vertically, slidably receivable. Said ring 121 has a planar upper surface 122, which has an arcuate groove 123 disposed below and facing the lower axial surface of the support hub 73 on the central housing 71. A plurality of circular wells 124 extend downwardly from the annular recess 120 into the pedestal 12. Resilient means, such as a spiral spring 125, is disposed in each said well 124. A flat, bearing ring 126 is disposed between the upper surface 122 of the sealing ring 121 and the lower axial surface of the support hub 73. The springs 125, which are held under compression partly by the weight of the turret head 11 upon the ring 121 and partly by the action of clamping nut 60 above described, urge said ring 121 upwardly against the flat ring 126. The sealing ring 121 is provided with a vertical exhaust port 127 (Figure 10), which communicates with the counterclockwise end of the groove 123 and into which a pipe 128 (Figure 3) is received. Said pipe 128 extends downwardly from the ring 121 for slidable but snug reception into an appropriate vertical opening 129 in the pedestal 12, said opening 129 communicating through the passageway 131 in the pedestal 12 with an exhaust pipe 130. The pipe 130 is connected to any convenient means, not shown, for developing a suitable low, below ambient, pressure.

The pipe 128 (Figure 3) has a sufficiently smaller outside diameter than the inside diameter of the circular well 124, through which it extends that a spiral spring 125 may encircle said pipe 128, as shown in Figure 3. Thus, the pipe 128, being slidable within the opening 129 leading downwardly from the well 124, permits vertical, slidable movement of the ring 121 within the annular recess 120, while preventing rotational movement of said ring 121 about its axis.

The arcuate groove 123 in the ring 121 extends slightly less than 270 degrees around the upper surface 122 of said ring 121, for reasons appearing hereinafter. A vertical, pressure port 132 is provided through the ring 121 (Figure 10) adjacent to, and spaced slightly from, the clockwise end of the arcuate groove 123, and is preferably spaced approximately 90 degrees from the exhaust port 127. The pressure port 132 is connectible to a pressure inlet pipe 133 (Figure 2) through conduit means, not shown, which may be substantially identical to that described hereinabove with respect to the exhaust port 127 and exhaust pipe 130. Said pressure pipe 133 is connected to a source of pressure fluid, not shown. For further details with respect to this structure, including the ring 121 and parts associated therewith, reference is made to Patent application Serial No. 546,507, filed November 14, 1955, and referred to hereinabove.

Figure 12:
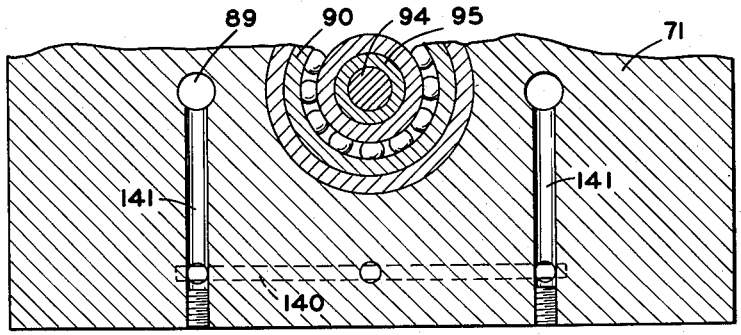
Figure 12 is a sectional view taken along the line XII—XII of Figure 3.

The support hub 73 and adjacent portion of the flat ring 126 are provided with a number of parallel and vertical passageways 138, which number, here four, is equal to the number of stations comprising an operational cycle of the machine. These passageways are preferably disposed at uniform, here 90 degree, intervals around the hub 73. Said passageways 138 communicate, respectively, at their upper ends with the inner ends of an equal number of radially disposed, horizontal passageways 139. The lower ends of the vertical passageways 138 are arranged (continuing to assume four passageways for illustrative purposes) so that three of them will communicate with the annular groove 123 in the ring 121, while the fourth passageway 138 will communicate with the pressure port 132, when the turret head 11 is in one of its four stations or indexed positions. Each of said horizontal passageways 139 communicates at its outer end with a horizontal groove 140 (Figure 12) in the inner face of the adjacent spindle housing 77. This groove 140 in turn communicates, by means of a pair of L-shaped passageways 141 in the side wall 78 (as shown in the portion 78a thereof in Figure 3), with the pockets 89 at the inner ends of the cylindrical recesses 83 and 84 (Figure 4). Thus, a fluid, such as compressed air, introduced into the pipe 133 (Figure 2) will pass through the port 132 (Figure 10), one of the vertical passageways 138 (Figure 3), the horizontal passageway 139, the groove 140 (Figure 12), and thence into the L-shaped passageways 141 to the pockets 89, and thence through the central passageways 87 in the mandrels 16.

A brake mechanism 143 (Figures 2, 3 and 11) is provided for operation in conjunction with the hub 73 of the turret head 11 to hold said head in a fixed position between indexing movements thereof and to prevent overtravel. Said brake mechanism is comprised of a brake drum 144, which encircles and is secured upon, the hub 73, and a brake band 145, which embraces a substantial portion of the drum 144. Said band 145 is connected at is opposite ends to the brake band actuator 146, by means of which said brake band is caused to snugly, and then loosely, engage the brake drum 144 in a substantially conventional manner. The brake band actuator 146 is pivotally supported upon the bracket 147 by means of the axially vertical pivot shaft 148. One end of the brake band 145 is secured to said actuator 146 adjacent to the pivot shaft 148, whereas the other end of said band is secured to the pin 149, which is spaced from said pivot shaft 148. Another point on said actuator 146, spaced from both the pivot shaft 148 and the pin 149, is pivotally secured, as by means of the pivot pin 151, to the actuating rod 152 of the pressure cylinder 153. Thus, in this embodiment, a leftward movement of the rod 152 will tighten the brake and a rightward movement will release it. The mandrels 16 are, in this particular embodiment, each provided with a cylindrical adapter 155 (Figures 1 and 4), upon which the articles, here tubular containers 156, are slidably mountable. Each adapter 155 has a coaxial opening 157, having an enlarged portion 157a at the inner end thereof, into which a mandrel 16 is snugly received and held in position by any convenient locking means. A container 156 is supplied to each adapter 155 at the loading station (station "A"), with its cap 158 previously applied thereto but which cap may or may not be tightened thereon.

Figure 8:
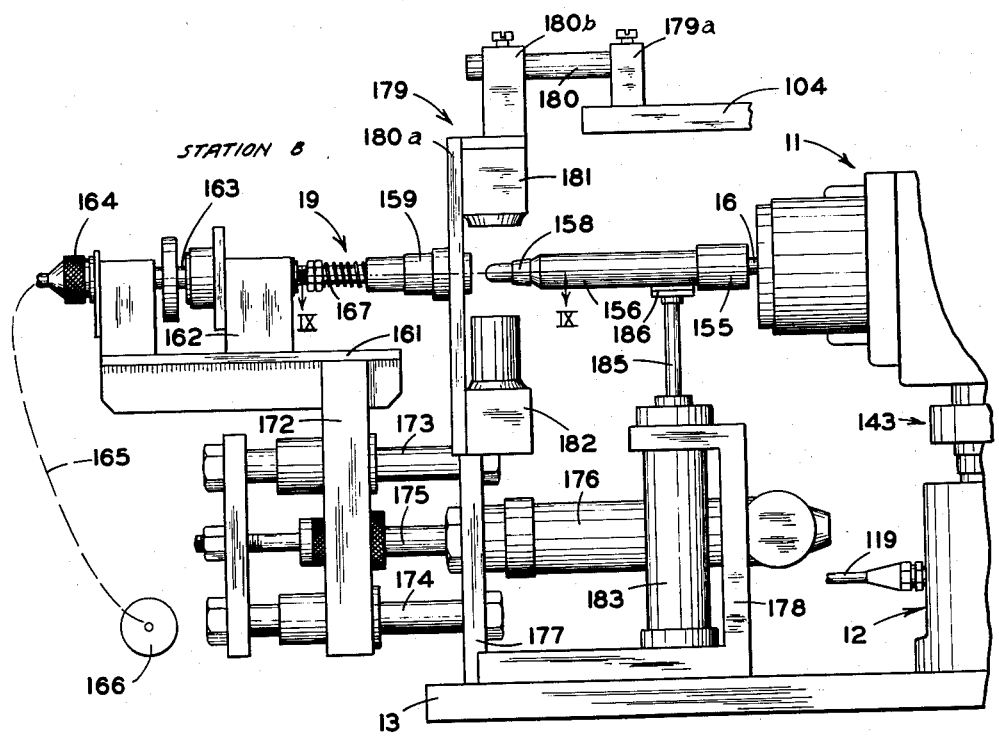
Figure 8 is a sectional view substantially as taken along the line VIII—VIII of Figure 1.

Such containers on each pair of mandrels 16 are then moved to the inspection and cap tightening station "B" (Figure 1), where the caps are engaged and tightened by a cap tightening apparatus 19 (Figures 1 and 8).

Figure 9:
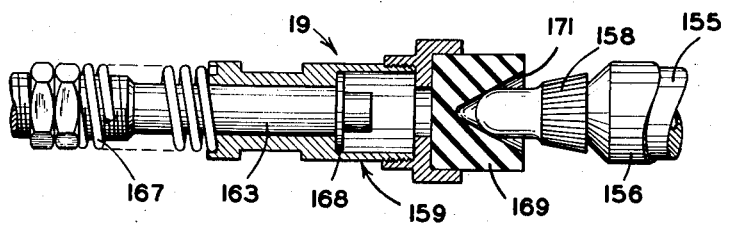
Figure 9 is a sectional view taken along the line IX—IX of Figure 8.

The cap tightening apparatus 19 is comprised of a pair of cap engaging heads 159 (Figures 1 and 8), which are rotatably supported upon the substantially horizontal platform 161 by means of the bearings 162. Each cap engaging head 159 (Figure 8) is slidably supported upon a shaft 163, which extends through its corresponding bearing 162, where it is connected by the coupling mechanism 164 to a flexible shaft 165, which is in turn driven by any conventional means, such as the motor 166. Each head 159 (Figure 9) is resiliently backed, as by means of the spiral spring 167, which continuously urges said head 159 against a flange 168 on the free end of the shaft 163. Said head 159 has a cap engaging fixture 169 with a conical recess 171 therein, into which said cap is received, said fixture being fabricated from a resilient material to prevent injury to the said caps.

The platform 161 (Figure 8) is horizontally slidably supported by means of the support member 172 on the horizontal slide rods 173 and 174, for movement toward and away from the axis of the turret head 11. Said support member 172 is engaged by the actuating rod 175 of a pressure cylinder 176, which, like the slide rods 173 and 174, is supported upon the top plate 13 of the frame structure 14 by structure including the substantially vertical support bar 177.

A pair of photoelectric cells, such as that shown at 181 in Figure 8, are supported upon the cam support plate 104 by structure 179 including the bar 179a (Figures 1 and 8) mounted upon the plate 104, the adjustment rods 180 secured to, and extending from, the bar 179a, and the hanger frame 180a, which is adjustably supported upon said rods 180 by the lugs 180b. The photoelectric cells are located just below the position of the caps 158 when their corresponding tubular containers 156 are in the inspection station "B." Light sources 182 (Figures 8 and 14) are supported upon the lower end of the frame 180a of said structure 179 directly below the photoelectric cells 181 in a conventional manner and for conventional purposes.

A pair of axially vertical pressure cylinders 183 and 184 (Figures 1 and 8) are supported upon means including the support bar 178 directly below a pair of mandrels 16 disposed within said inspection and cap tightening station "B." The upper ends of the actuating rods 185 of the pressure cylinders 183 and 184 are provided with pads 186 and 186a, respectively, for engaging the tubular containers 156 for the purpose of preventing rotation thereof when the caps 158 are engaged and rotated by the cap tightening apparatus 19.

The label applying machine 18 (Figure 2) may be of a substantially conventional type and is here illustrated and briefly described solely to illustrate the purpose and functioning of the present invention.

In the labeling machine here shown, there is provided a motor 21 connected to means, such as a pinion 189 and rack 190, for raising a suitable elevator 191, upon which two stacks of labels 192 are supported. Said machine 18 also includes a carrier 193 and means, not shown, for supporting and moving said carrier between a position above the stacks of labels 192 and a position over the labeling station "C" (Figures 1 and 2). Suction, applied from any convenient source through tube 216 to the carrier 193, is utilized to pick up a label from said stack and to hold it until it is applied to a container. During the movement of the carrier 193 between the stack of labels 192 and said station "C," the labels are caused by said carrier to pass across a roller 194 for placing the adhesive on the label, after which the labels are placed by the carrier 193 upon whatever tubular containers 156 are at a given moment in the labeling position and released thereto by interrupting said suction.

The labeling machine 18 (Figure 2) also includes a label applying head 195 mounted upon an arm 196 and having a plurality of rollers 197, which engage the upper surface of the containers 156 in the label applying station "C" for rolling a label 192 upon such containers. The head 195 reciprocates vertically, as shown in Figure 2, between its solid and broken line positions, whereas the carrier 193 reciprocates primarily in a horizontal, direction between its broken and solid line positions above the elevator 191 and above the label applying station "C."

A timing control 200 (Figure 14), which is comprised of a cam supporting drum 201 and a plurality of microswitches associated therewith, may be provided for the purpose of properly sequencing and timing the operation of the various auxiliary mechanisms, such as the cap tightening apparatus 19 and brake mechanism 143, which are associated with the operation of the article handling machine 10. As indicated diagrammatically in Figure 2, the cam drum 201 of the timing control is preferably coupled with the drive mechanism 15 of the article handling machine 10 to assure coordination in their operations.

Figure 11:
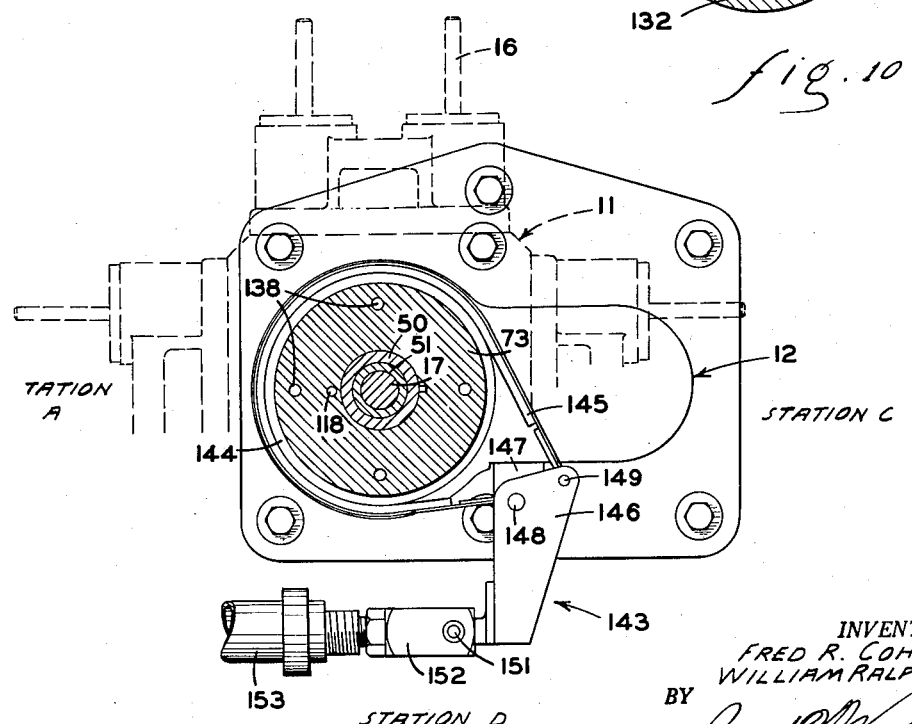
Figure 11 is a sectional view taken along the line XI—XI of Figure 2.
Figure 14:
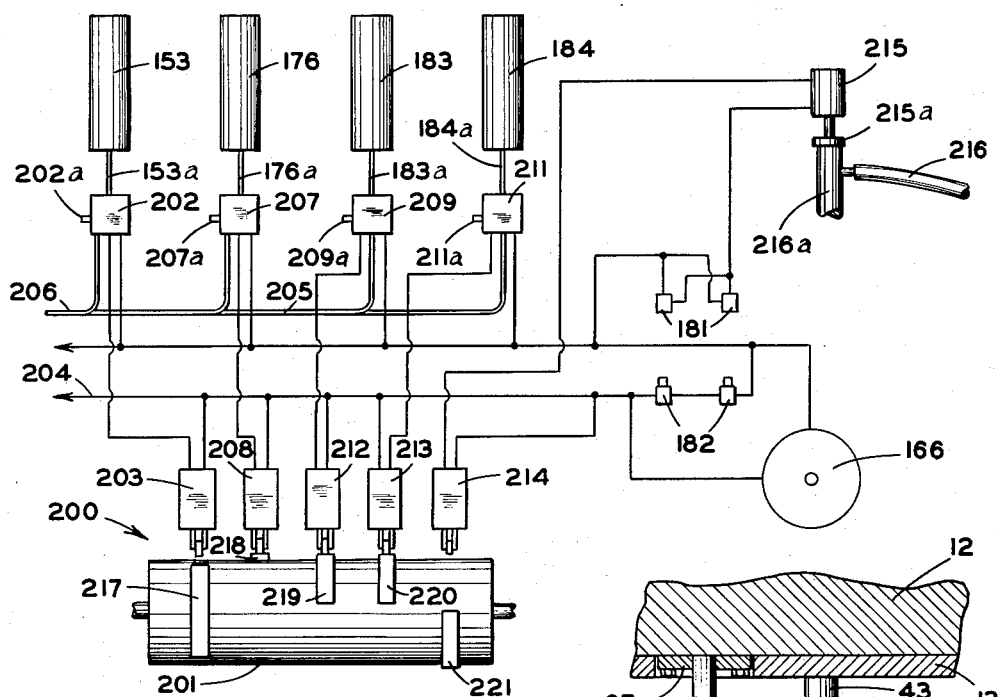
Figure 14 is a diagrammatic view of part of the electrical and pressure fluid control system of the machine.

As shown in Figure 14, the pressure cylinder 153, which is associated with the brake mechanism 143 shown in Figure 11, is connected to a solenoid valve 202, which is in turn connected in series with a microswitch 203 to a source 204 of electrical energy. The solenoid valve is also connected by the pipe 205 to source 206 of pressure fluid. The pressure cylinder 176, by means of which the cap engaging heads 159 are moved toward and away from the turret head 11, is connected to a solenoid valve 207, which is in turn supplied through the piping 205 from the source 206 of pressure fluid. Said valve 207 is energized by, and connected in series with, a microswitch 208 to the electrical energy source 204. The pressure cylinders 183 and 184 (Figure 1), which cause the pads 186 to engage the tubular containers 156 on the mandrel adapters 155, are operated by the solenoid valves 209 and 211, respectively, which are in turn connected through piping 205 to the source 206 of pressure fluid. The electrical portions of the solenoid valves 209 and 211 are respectively connected in series through the microswitches 212 and 213 to said electrical energy source 204.

The light sources 182 for the photoelectric cells 181

(Figures 8 and 14) are connected in series with each other and the source 204 of electrical energy. The electric motor 166, utilized for actuating the cap engaging heads 159, is connected in parallel with the light sources 182. The microswitch 214 may be connected in series with the photoelectric cells 181, which latter are in parallel, and with the solenoid valve 215 which controls the suction applied to the label carrier 193 through the pipe 216. The microswitches 203, 208, 212, 213 and 214 are operable in a substantially conventional manner by cams 217 through 221, inclusive and respectively, which cams are supported upon the cam drum 201.

*Alternate structure*

It will be recognized that some of the auxiliary mechanisms associated with the article handling machine 10 may be modified substantially, without departing from the scope of the invention. For example, where it is not necessary to hold the containers themselves against rotation, that is, where merely holding the mandrels against rotation is enough, the pressure cylinders 183 and 184 and the operating mechanism associated therewith may be eliminated by use of structure such as that appearing in Figures 15 and 16.

The connecting chamber 82a (Figure 15) is a modified form of the chamber 82 shown in Figure 4, which permits the placement of a pinion lock bar 225 between the spindle gear 93b and the end walls 78 of the central housing 71. Said lock bar 225 has a central opening 226, whereby said bar is slidably disposed upon the spindle shaft 224, which is slightly reduced in diameter at the region of engagement of the bar 225 to provide the shoulder 227. Said gear 93b is spaced from the end wall 78 a distance substantially greater than the thickness of the bar 225. A spacer 228 is provided upon the spindle shaft 224 between said bar 225 and the gear 93b. Resilient means, such as the spiral spring 229, encircles the spindle shaft 224 between the shoulder 227 and said bar 225, for urging said bar snugly against the spacer 228 and thereby urging the spacer 228 snugly against the gear 93b. The bar 225 has teeth 231 at the opposite ends thereof, which are engageable with the teeth on the pinions 91 and 92. The spacer 228 combines with the hub on the gear 93b to maintain an axial distance between the teeth on said gear 93b and the bar 225, which is slightly greater than the axial extent of the teeth on the pinions 91 and 92. Thus, the gear 93b will be fully disengaged from the pinions 91 and 92 when said lock bar 225 commences to engage said pinions 91 and 92, and vice versa. The teeth 231 on one end of the bar 225 are preferably set thereon at a distance from the gear 93b slightly greater than the distance between said gear and the teeth on the other end of said bar 225. This arrangement will facilitate engagement between the teeth on said bar 225 and said pinions 91 and 92. The same result can be accomplished by axially offsetting one of said pinions 91 and 92 with respect to the other. In such case, reeengagement of the gear 93b with the pinions 91 and 92 will also be facilitated. Guide rods 232 and 233 are mounted upon, and extend from, the lock bar 225, parallel with the axis of the mandrel shaft 224 and on opposite sides thereof. Said rods 232 and 233 slidably extend into the guide openings 234 and 235, respectively, in the end wall 78 on opposite sides of the bearing 90, and thereby prevent rotation of the bar 225 with respect to the wall 78. Thus, when said teeth 231 are in engagement with the teeth on the pinions 91 and 92, said pinions, hence the spindles 16, are positively prevented from rotating.

*Operation*

Under normal operating conditions with manual feeding of the containers to be labeled, the operator of the article handling machine 10 is located adjacent to the loading station "A" (Figure 1), where he manually places a pair of articles, such as the tubular containers 156, upon the mandrel adapters 155, which are supported upon the mandrels 16, as shown in Figure 4. A supply of the tubular containers 156 may, for example, be placed upon the cam support plate 104 (Figure 2). A receptacle, indicated in broken lines at 20 in Figure 1, may be supported upon the top plate 13 beneath, and adjacent to, the discharge station "D," for receiving the tubular containers 156 from the mandrel adapters 155 disposed in said discharge station "D." It will be recognized that various sizes of containers 156 will require corresponding adapters 155. Accordingly, adjustments may be re-
as the photoelectric cells 181 and light source 182 (Fig-
as the photoelectric cells 181 and light sources 182 (Figures 8 and 14), the cap tightening apparatus 19, and the label applying mechanism of the label applying machine 18, with respect to the pivotal axis of the turret head 11.

The light sources 182 and photoelectric cells 181, which are both supported upon the structure 179 (Figure 8), are adjusted along the rods until they are located in proper over-and-under positions with respect to the capped ends of the tubular containers 156. The support member 172 of the cap tightening apparatus 19 is adjusted with respect to the actuating rod 175 on the pressure cylinder 176 to properly locate the cap engaging heads 159 of said apparatus with respect to the location of the caps 158 of the tubular containers 156. A supply of labels 192 is placed in two stacks upon the label elevator 191 in the label applying machine 18, whereupon the entire assembly, including the article handling machine 10, the label applying machine 18, the cap tightening apparatus 19, and other auxiliary mechanisms, are now ready for operation.

With the machine now ready for operation, attention will first be directed toward the operation of its several units, after which the operation of the entire apparatus will be considered.

Power originating in the motor 21 will be conducted through the drive chain 31 and the gear 29 to and through the drive mechanism 15 and thence through the gear box 26 to the shaft 38 in the pedestal 12. The shaft 38 will rotate the Geneva driver 44 and the cam wheel 45 at a constant rate. Interaction of the roller 64 with the grooves 63 in the Geneva wheel 57 will in a conventional manner result in intermittent rotative motion of the sleeve 50 and thereby intermittent rotative motion of the turret head 11.

At the same time, the rotative motion of the cam wheel 45 will effect motion of the roller 65 (Figure 6) toward and away from the axis of the shaft 38. This motion of the cam follower 65 applied to the lever 66 will effect an oscillating motion of said lever around its pivot point 67 which, through action of the link 68, will effect a corresponding oscillation of the lever 69 and of the shaft 17. The oscillating motion of the shaft 17 will result in oscillating motion of the bevel gear 103. Adjustment mechanism 70 including the screw 70a is provided to move the leftward end of the link 68 toward or away from the shaft 17. Said adjustment mechanism is conventional. Thus, adjustment of the link 68 toward or away from the shaft 17 will determine the magnitude of oscillation of said shaft. The rate of oscillation of said shaft at any given part of an operating cycle will be determined by the shape of the groove 47.

Now considering together the motions of the bevel gear 103 and the motion of the turret head 11, it will be seen that four conditions will occur:

(a) When the turret head 11 is stationary and the bevel gear 103 is moving in one rotative direction, said bevel gear 103 will act through the bevel gears 96 to rotate the driving gears 93. These driving gears will in turn act through the pinions 91 and 92 and effect rotation of the several mandrels 16.

(b) Where the turret head 11 is stationary and the bevel gear 103 is rotating in the opposite rotative direction, a similarly transmitted chain of motion will effect rotation of the mandrels in the opposite direction.

(c) Where the bevel gear 103 and the turret head 11 are both rotating in the same direction, but at different rates, there will still be relative movement between the bevel gear 103 and the bevel gears 96 and hence there will be rotation of the mandrels.

(d) Where the bevel gear 103 and the turret head 11 are both rotating in the same direction, and at the same rate, then there will then be no relative movement between the bevel gear 103 and the bevel gears 96 and hence there will be no rotation of the mandrels.

Further, having in mind that the cam 107 is stationary, it will be apparent that rotation of the turret head 11 will cause the several cam follower heads 98 to follow said cam and to move outwardly away from the center of said cam as said heads respectively encounter the lobe 108. Movement of said heads away from the center of said cam will move the driving gears 93 radially outwardly into the position indicated in broken lines in Figure 4 and thus disengage said driving gears from their respectively associated pinions 91 and 92, thereby interrupting the driving of the mandrels 16.

Referring now to the application of suction or pressure onto the mandrels 16, attention will first be directed toward the suction operation. Application of suction to the line 130 reduces the pressure within the opening 129 and this causes a reduction of pressure to travel through the pipe 127, the groove 123 in the ring 121, thence through any passageway 138 in register therewith, thence through the groove 140 (Figure 12) and the passageways 141 to appropriate ones of the chambers 89 behind the several mandrels. Thus, so long as a passageway 138 is in register with the groove 123, the mandrels connected to such passageway will have their central passageways 87 under reduced pressure, whereby containers placed on said mandrels will be held firmly in place.

When a passageway 138 passes the opening 132, which is connected to the pressure line 133, then a pressure higher than atmospheric will be conducted through the same line of passageways and applied to the several passageways 87 in the mandrels and thereby effect removal of the containers from the mandrels. It will be evident that the location of the passageway 132 and the length of the groove 123 will be arranged to cause the suction and the pressure to be applied to the central passageways 87 of the mandrels at whatever points in their operating cycles these functions are desired.

The control and timing function is performed by a mechanism associated with the cam 201, which cam is positively driven (Figure 2) from the driving mechanism 15 and is thereby positively timed with respect to the operation of the rest of the apparatus. The cams function in a conventional manner to actuate each of the microswitches 203, 208, 212, 213 and 214 and their actuation closes the several circuits to which they are connected. Closure of the switches 203, 208, 212 or 213 energizes the respectively connected solenoid valves 202, 207, 209 or 211 to admit pressure fluid into any one of the respectively connected pressure cylinders 153, 176, 183 or 184.

While these solenoid valves and their connections with respect to pressure cylinders can utilize any arrangement that is convenient, including double acting connections for the cylinders, they are here shown as connected to the respective pressure cylinders by only a single conduit, indicated at 153a, 176a, 183a and 184a, respectively, which are pressurized when the solenoid valves are in pressurizing position. When said valves are in non-pressurizing position, the pressure within the several pressure cylinders is then permitted to return through said conduits and through said valves to the exhaust ports respectively indicated at 202a, 207a, 209a and 211a.

The operation of the cap tightening mechanism is best understood by reference to Figures 1 and 8. The motor 166 operates continuously, in view of its connection to opposite sides of the power source 204 (Figure 14), and hence the cap tightening mechanism 19 will rotate continuously so long as the spring 167 is permitted to urge the cap engaging heads 159 against the flange 168. Thus, upon actuation of the pressure cylinder 176, the rod 175 extending from said cylinder draws the support 172 along the guides 173 and 174 rightwardly as appearing in Figure 8 and thereby moves the cap engaging fixture 169 (Figure 9) against the caps 158. Rotation of the cap engaging fixture 169 by the head 159 screws the caps 158 tightly onto the container 156 but slippage is permitted between the cap engaging heads 159 and the flange 168 to terminate the rotation of the caps 158 when they are fully tightened.

Pressurizing of the cylinders 183 and 184 occurs simultaneously with the pressurizing of the cylinder 176 and this extends the holding pads 186 against the containers 156 for holding them tightly against the respective mandrels 16 and for holding both of such containers and such mandrels against rotation during the cap tightening operation.

Referring now to the inspection function, reference to Figure 14 will show that when the photocells 181 are rendered conductive, and assuming the microswitch 214 is also rendered conductive, the source 204 will be permitted to energize the solenoid valve 215. This will lift the valve 215a off the end of the conduit 216a and thereby admit air into the vacuum line 216. This will deenergize the label lifting part 193 (Figure 2) of the labeling machine and thus no labels will be picked up from the stack 192. As shown in Figure 8, the parts are so arranged that only the cap 158 blocks light originating in the source 181 from striking the photocell 182. Thus, if either a container, which necessarily means also the cap, is missing or if only a cap alone is missing, the photocell 181 will be energized and operation of the label pick-up mechanism 193 will be prevented as above described. Further, by reference to Figure 14 it will be apparent that the photocells 181 are connected in parallel with respect to each other so that if, in the case of twin mandrels, a cap is missing from a container on either mandrel, the solenoid valve 215 will be energized with the results above described.

The light sources 182 are placed across the line 204 and are thereby constantly energized. The function of the cam 221 is only with respect to the photocells 181 so that their energization is rendered effective only at a time when a pair of caps should properly be located in position to block the beams from the light sources, that is, in cap tightening position.

Upon energization of the control circuit (Figure 14) and of the pressure fluid supply, together with energizing of the motor 21 in the label applying machine 18, operation of the entire assembly will immediately commence. Since each set of mandrels is cycled or sequenced through all four of these stations by the indexing or drive mechanism 15 located within the frame structure 14, a detailed description of the sequencing of one set of mandrels 16 through the four stations will serve to illustrate the sequencing of any of the sets of such mandrels 16. Commencing with the machine energized and with a pair of mandrels 16 disposed at station "A," and with the turret 11 in non-moving condition, the operation of the machine with respect to tubular containers 156, which are placed on said mandrels while in station "A," will proceed as follows:

When the roller 64 of the Geneva driver leaves a given slot 63, the sleeve 50 and consequently the turret head 11 will be in non-rotative condition which may be taken as the loading point for a pair of selected mandrels 16. While the turret 11 is in non-rotative condition, the groove cam track 47 acting through the cam follower 65 and the linkage connected thereto, effects a partial rotative motion of the shaft 17 as above described and will cause rotation of the mandrels at the loading position. Simultaneously, the position of the groove 123 is such that vacuum is supplied from the source 130 to the mandrels at the loading position by which the containers applied thereto are held snugly in place. In this condition of the apparatus, containers may be supplied to the mandrels at the loading position either manually or by a suitable automatic feeding mechanism.

The roller 64 of the Geneva driver will now enter the next one of the grooves 63 and effect a quarter-turn rotation of the Geneva wheel, resulting in a similar turn of the turret head 11. While the turret head 11 is turning, the cam groove 47 is returning the shaft 17 to what may be considered its initial position and it does so in such a direction that said shaft is rotating in the same direction with the sleeve 50 so that there is little, if any, relative motion between the bevel gear 103 and the several bevel gears 96. This minimizes the rotation of the spindles during the movement of the turret 11 from one station to the next station. When the mandrels which we are following for illustrative purposes reach the cap tightening station, station "B," the Geneva driving roller 64 has moved out of its second groove 63 and the turret head stops.

Where the brake structure 143 is used, the cam 217 (Figure 14) actuates the microswitch 203 by which the cylinder 153 is energized at about the time the driving roller 64 starts to leave the radially innermost end of said second groove 63. This results in tightening of the brake structure 143 at the point where the maximum inertia forces oppose deceleration thereby preventing wind-up of the sleeve 50 in response to inertia and insuring its being held firmly against further rotation during the next operation.

As the mandrels being here followed approach station "B," the parts 98 associated therewith ride up on the cam roller 108, disconnect the driving gear 93 from the pinions 91 and 92 and thereby stop the driving of the mandrels. As soon as said mandrels have fully entered station "B," the microswitches 212 and 213 are immediately energized resulting in the energization of the cylinders 183 and 184. The pads 186 thereupon engage the containers to hold them firmly against rotation. Immediately upon the attaining of this condition, the pressure cylinder 176 is energized and the cap tightening mechanism 19 is moved into engagement with the caps and the cap tightening operation takes place, after which said pads 186 and the cap tightening mechanism 19 are retracted out of contact with the containers. Thereupon, the drive mechanism 15 within the frame structure 14 will cause the turret head 11 to index the mandrels 16 from station "B" to station "C." The simultaneous, rotational movements of the turret head 11 and the drive shaft 17, effected as before by the Geneva wheel 57, the cam wheel 45 and their associated linkage, will be repeated during this indexing movement, thereby again placing the drive shaft 17 in position for effecting another rotation of the mandrels 16 while they are in the label applying station "C." It will be observed that, during the movement from station "B" to station "C," the shaft 94 will be disengaged from the cam lobe 108, thereby permitting the gear 93 to move in response to the force applied by spring 99 from its broken line position 93a back into its solid line position, and thus back into engagement with the pinions 91 and 92.

Figure 10:
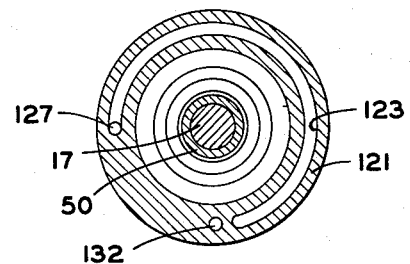
Figure 10 is a sectional view taken along the line X—X of Figure 3.

During the indexing of the mandrels 16 from the station "B" to station "C," said carrier 193 (Figure 2) will move from its broken line position to its solid line position, arriving at its solid line position shortly after the mandrels 16 arrive in station "C." During such movement, the label carrier 193 (Figure 2) will be moving labels from the stacks 192 within the labeling machine 18 across the roller 194 for deposit of said labels on the tubular containers 156. After the labels are deposited upon the two containers 156 disposed within station "C," the carrier 193 will move away and the rollers 197 mounted upon the labeling head 195 will be moved downwardly by said labeling head into position against the peripheral surface of the tubular containers 156. The cam wheel 45, drive shaft 17 and parts associated therewith, will cause the mandrels 16 to rotate said containers in station "C," thereby rolling the labels upon the containers. While this rolling is occurring, the carrier 193 will move back to the broken line position in Figure 2 for the purpose of picking up two more labels. The arcuate groove 123 will still be communicative with the central passageway 89 in the mandrels 16 when said mandrels are in station "C." Thus, the suction created through the exhaust pipe 130 will still be holding the tubular containers upon their corresponding mandrel adapters 155. Further, as shown in Figure 10, such suction will continue to remain effective upon the tubular containers 156 until the mandrels upon which they are mounted almost reach the station "D" where the containers are discharged from said adapters.

Shortly after the labeling operation has been completed upon the tubular containers 156 disposed within station "C," the turret head 11 is again indexed in the manner set forth above so that the particular pair of mandrels 16, which have been followed up to this point, are moved into station "D." During such indexing, the vertical passageway 138 in the hub 73 (Figure 3) will become disconnected from the arcuate groove 123. Upon reaching station "D," the vertical passageway 138 will become aligned with the pressure port 132 (Figure 10), which is connected to the pressure inlet pipe 133 shown in Figure 2. Accordingly, the pressure within the pipe 133 will move into the central passageways 89 in the mandrels 16 and be expelled through the central opening 157 in the mandrel adapters 155, whereby said tubular containers 156 will be discharged from their positions upon the mandrel adapters 155 disposed in said discharge position "D." The discharged tubular containers 156 may be received into the receptacle 20 shown in Figure 1. In due course, the head 11 is again indexed through an angle of approximately 90 degrees so that the mandrels 16 return to the loading station "A." This indexing will be accomplished in the same manner as set forth above and will compete one sequence of operations of the machine with respect to the two mandrels.

Concurrently with the indexing of the two mandrels through the four stations, the other three pairs of mandrels will be following in order through the identical sequence of operations, providing tubular containers 156 are all properly mounted upon the mandrel adapters 155 as they pass through the inspection station "B."

In general, the article handling machine 10 is so arranged and constructed that the mandrels 16 will be rotated while the turret head 11 is in any of the stations except station "B," where the lobe 108 on the cam 107 effects a disengagement between the gear 93 and the pinions 91 and 92. However, while the head 11 is rotating, the mandrels 16 will, during at least part of such rotation, have their rotation stopped, substantially reduced or possibly even reversed, depending upon the particular arrangement of the linkage connecting the cam wheel 45 to the drive shaft 17, and the Geneva mechanism associated with the sleeve 50.

During all of the foregoing described operation, a lubricating material, preferably in the form of an oil mist, is fed into the lubrication inlet pipe 117 and will move first into the mandrel chambers 82, thence through the bearing 90 supporting the shaft 94 into the cavity 72 within the central housing 71, thence through the vertical passageway 118 (Figure 3) in the hub 73, thence through the upper drive shaft bearing 54 into the opening 53 between the drive sleeve 59 and the pedestal 12 and finally out through the outlet pipe 119 (Figure 8). The sealed bearing 55 supporting the lower end of the sleeve 50 prevents escape of the lubricant through the lower end of the opening 53.

The alternate form shown in Figures 15 and 16 can, for reasons which will be apparent hereinafter, be used only where it is sufficient to stop the rotation of the mandrels and it is not necessary to hold the containers themselves in non-rotative condition, such as where the containers are made of a material having an extremely high coefficient of friction with respect to the material from which the mandrels are made or where the caps are screwed on only lightly, but it has the advantage of effecting the non-rotation of said mandrels automatically with the discontinuing of the driving effect of the driving gears 93 and permits the elimination of the pressure cylinders 183 and 184 and the control mechanism associated with said pressure cylinders.

In this structure, the lock bar 225 is moved at least against the pinions 91 and 92 simultaneously with the movement of the gear 93b away from said pinions by action of the cam follower head 98b against the cam lobe 108. If the teeth 231 of the lock bar 225 are able to mesh immediately with the teeth of the pinions 91 and 92, the spring 229 will effect such meshing. Otherwise, the teeth of the lock bar 225 will merely bear against the adjacent surface of the teeth of the pinions 91 and 92 until a slight rotative motion of said pinions will permit meshing whereupon the spring 229 will effect such meshing immediately.

Figures 15, 16:
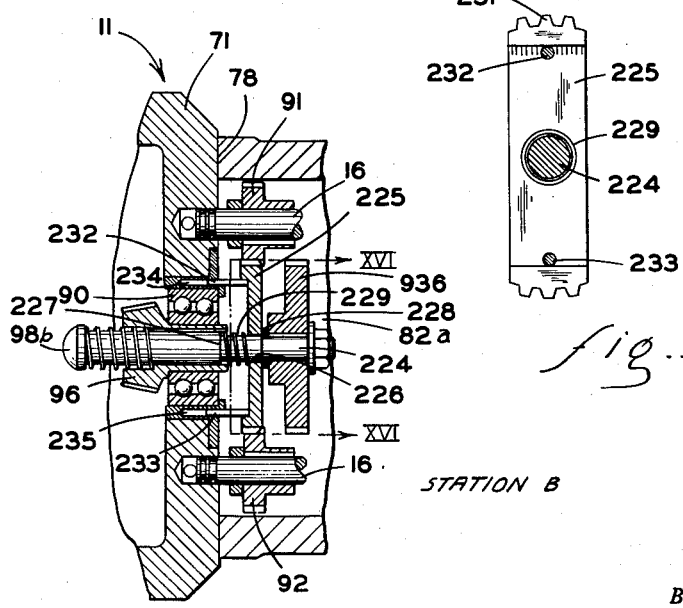
Figure 15 is a fragment of Figure 4 disclosing an alternate structure.
Figure 16 is a section view taken along the line XVI—XVI of Figure 15.

Returning movement, leftwardly as appearing in Figure 15, of the driving gear 93b will effect reengagement of said driving gear with said pinions in the same manner as described above.

In some instances, particularly where the machine is relatively small, it may be found unnecessary to use the brake mechanism 143 and in such case it may be eliminated without changing the operation of the rest of the mechanism. However, in larger, or more rapidly operating, machines where inertia is an appreciable factor, it will be found that the use and careful timing of said brake as above set forth will appreciably improve the operation of the entire apparatus.

It will be recognized that, although the article handling machine 10 has been described in detail hereinabove with respect to the specific function and operation of placing labels on tubular containers, it will be possible to utilize a machine of this general construction for a variety of different purposes, without departing from the scope of the invention. Furthermore, it will be recognized that the number of stations may be varied from the four specifically set forth hereinabove to any other desired number and thereby accommodate the machine 10 to operations requiring more or less than four stations, by making suitable modifications in the driving and control mechanisms.

Accordingly, it will be understood that such variations and modifications are intended to be embraced by this application, unless specifically stated to the contrary in the appended claims.

We claim:

1. A turret-type, article handling machine, comprising: a turret head and means rotatably supporting same; article holding means rotatably supported upon said turret head at spaced intervals therearound; a shaft rotatably and coaxially mounted in said turret head and drivingly connected to said article holding means for rotating same; actuating means, including linkage connected to said turret head and said shaft, for rotating said turret head and for oscillating said shaft, said linkage moving said turret head and said shaft at least partially simultaneously in the same circumferential direction and then moving said shaft with respect to said turret head in the opposite circumferential direction; and means for automatically disconnecting said shaft from said article holding means at selected intervals in the rotation of said turret head.

2. In a turret-type machine having a plurality of pairs of uniformly spaced container supporting members rotatably supported upon a turret head and having mechanisms for rotating said members, the combination comprising: a driven gear connected in driving relationship to each of said container supporting members; a shaft extending transverse to the axis of rotation of said turret head and being axially slidably and rotatably supported upon said turret head and disposed between the driven gears for each of said pairs of container supporting members, said shaft carrying a driving gear normally in driving relationship with both of said driven gears but movable out of driving relationship with said driven gears upon axial sliding of said shaft; means normally holding said driving gear in driving relationship with said driven gears; means selectively effecting rotation of said shaft; a fixed cam; a cam follower connected to said shaft for moving same axially for effecting said sliding movement of said shaft in response to movement of said cam follower on said cam as said turret head rotates with respect to said cam.

3. A turret-type, article handling machine, comprising: a turret head and means rotatably supporting same; article holding means rotatably supported upon said turret head at spaced intervals therearound; a shaft rotatably and coaxially mounted in said turret head and drivingly connected to said article holding means for rotating same; actuating means, including a Geneva mechanism for rotating said turret head intermittently and uni-directionally through a selected arc, and cam mechanism for oscillating said shaft through an angle substantially equal to the angle of said arc, the movement of said shaft in the direction of movement of said turret head being effected substantially simultaneously with, and at substantially the same angular speed as, the intermittent movement of said turret head.

4. A turret-type machine for handling containers, comprising: a turret head and means rotatably supporting same; container holding mandrels rotatably mounted upon said turret head at spaced intervals around the circumference thereof; a shaft rotatably and coaxially mounted in said turret head; an annular bevel gear secured to said shaft and located within and coaxial with said turret head; radially movable, rotatable gear means normally drivingly connected to each of said container holding mandrels, each said gear means being mounted in said turret head for movement therewith and being operable when rotated to effect rotation of its associated container holding mandrel, said gear means being in driving relationship with said bevel gear; a fixed cam within said turret head and operatively connected to said gear means for moving same radially and thereby disconnecting each said gear means from said bevel gear when each gear means is located in a predetermined position during its movement with said turret head; actuating means including a series of interconnected elements connected to said turret head and said shaft for first indexing said turret head and rotating said shaft to thereby rotate said mandrels and then rotating said shaft with respect to said turret head to rotate said gear means, except the gear means in said predetermined position, to effect rotation of all but selected ones of said mandrels.

5. A turret-type machine for handling containers, comprising: a turret head and a rotatable sleeve supporting said turret head; mandrels for supporting said containers, said mandrels being rotatably mounted upon said turret head at spaced intervals around the circumference thereof; a shaft extending through and being coaxial with said sleeve, said shaft extending into said turret head; an annular bevel gear secured to said shaft and located within and coaxial with said turret head; gear means drivingly connected to each of said mandrels, said gear means each including a first gear secured to a mandrel, a second gear in constant mesh with said bevel gear and a third, radially movable gear; a rotatable, radially movable gear shaft, said second gear being slidably mounted on said gear shaft and being drivingly connected thereto, said third gear being fixed to said gear shaft and being rotatable and radially movable therewith; a fixed cam within said turret head, said cam having a radially outwardly extending lobe; spring means urging said gear shaft against said cam so that said gear shaft is in its radially outer position and said mandrel is out of driving connection with said bevel gear when said gear shaft engages said lobe and said gear shaft at all other times is in its radially inner position and said mandrel is drivingly connected to said bevel gear; actuating means including a series of interconnected elements connected to said turret head and said shaft for first indexing said turret head and rotating said shaft and then rotating said shaft with respect to said turret head.

6. A turret-type machine according to claim 5 including a lock bar mounted on said gear shaft and movable radially inwardly and outwardly therewith into and out of a position engaging said mandrel; and means for preventing rotation of said lock bar with respect to said turret head.

7. A turret-type machine according to claim 5 wherein said mandrels are arranged in pairs, the mandrels of each pair being substantially parallel, the first gears on said mandrels being normally located for meshing engagement with a single third gear located therebetween.

8. A turret-type machine for handling containers, comprising: a turret head and a rotatable sleeve supporting said turret head; mandrels for supporting said containers, said mandrels being rotatably mounted upon said turret head at spaced intervals around the circumference thereof; a shaft extending through and being coaxial with said sleeve, said shaft extending into said turret head; an annular bevel gear secured to said shaft and located within and coaxial with said turret head; rotatable gear means drivingly connected to each of said mandrels, each said gear means being mounted in said turret head for movement therewith and being operable when rotated to effect rotation of its associated mandrel; means normally maintaining each said gear means in driving relationship with its associated mandrel; a fixed cam within said turret head and operatively connected for disconnecting said gear means from its mandrel when said gear means is located in a predetermined position during its movement with said turret head; a Geneva wheel secured to said sleeve; an actuating arm secured to said shaft; a single power source; a cam shaft driven by said power source; a Geneva driver secured to said cam shaft and being engageable with said Geneva wheel to cause indexing of said sleeve and said turret head; a cam wheel mounted on said cam shaft; a cam follower engaging said cam wheel and linkage connecting said cam follower to said actuating arm so that said actuating arm will effect oscillation of said shaft in response to rotation of said cam wheel.

9. A turret-type, article handling machine, comprising: a turret head and a sleeve rotatably supporting same; article holding members rotatably mounted upon said turret head at spaced intervals around the circumference thereof; a shaft within and extending coaxially through said sleeve, said shaft being rotatably and coaxially mounted in said turret head and drivingly connected to said article holding members for rotating same; a single power source; actuating means including mechanism for effecting intermittent and unidirectional, rotative movement of said sleeve and mechanism for effecting oscillating movement of said shaft, said actuating means also including a series of interconnected elements connecting said power source to said mechanisms and coordinating the action of said mechanism so that said power source effects rotative movement of said turret head and said shaft at least partially simultaneously in the same circumferential direction and then effects rotative movement of said shaft with respect to said turret head in the opposite circumferential direction; and means for automatically disconnecting said shaft from said article holding members at selected intervals in the rotation of said turret head.

10. A turret-type, article handling machine, comprising: a turret head and means rotatably supporting same; article holding members rotatably mounted upon said turret head and being arranged in pairs at spaced intervals around the circumference thereof; a shaft rotatably and coaxially mounted in said turret head and drivingly connected to said article holding members for rotating same; a single power source; actuating means, including a series of interconnected elements connecting said power source to said turret head and said shaft for first effecting rotative movement of said turret head and said shaft at least partially simultaneously in the same circumferential direction and then effecting rotative movement of said shaft with respect to said turret head in the opposite circumferential direction; each pair of said article holding members being connected by a gear train to said shaft, each gear train including a second, axially shiftable shaft and a gear supporting upon said second, axially shiftable shaft; and a fixed cam engageable with said second shaft of each gear train for moving said second shaft axially and thereby shifting said gear out of operative position within said gear train once during each revolution of said turret head.

11. A turret-type, article handling machine, comprising: a turret head; a plurality of uniformly spaced, container supporting members rotatably supported upon said turret head; means for intermittently and alternately rotating said turret head and said members; means for disconnecting said last-named means from said members at one position in their path around the axis of said turret head; holding means mounted adjacent said turret head and means for moving said holding means into and out of engagement with said members when same are in said position so that said holding means may resist rotation of said members; rotatable cap tightening mechanism disposed adjacent said position and means for moving same toward and away from said members when said members are in said position so that said cap tightening mechanism may engage, rotate and thereby tighten caps on containers supported upon said members; means for rotating said cap tightening means to thereby tighten caps on said containers; control means for intermittently rotating said turret head and, during the interval between rotations of said turret head, for causing said holding means to be moved into engagement with the members in said position and then causing said cap tightening mechanism to be moved into engagement with caps on containers on said members and then rotating said cap tightening mechanism to tighten the caps while said members are held stationary at said one position.

12. Apparatus for tightening caps on containers, said containers being supported upon rotatable support members which are successively presented to a capping station, comprising in combination: holding means adjacent said capping station and means for moving said holding means into or out of engagement with said support members so that said holding means may releasably hold said support members against rotation when said support members are at said station; rotatable cap tightening mechanism disposed adjacent said station and means for moving said cap tightening mechanism toward and away from said support members when same are at said station so that same may engage caps on containers supported upon said support members; means for rotating said cap tightening mechanism; control means for operating said means for moving said holding means, said means for moving said cap tightening mechanism and said means for rotating said cap tightening mechanism in timed relation so that caps may be rotated and thereby tightened on containers while rotation of the containers is prevented by said holding means.

(References on following page)

References Cited in the file of this patent

UNITED STATES PATENTS

| | | | |
|---|---|---|---|
| 1,598,392 | Risser | Aug. 31, | 1926 |
| 1,871,799 | Koeuigshofer | Aug. 16, | 1932 |
| 1,933,500 | Spring | Oct. 31, | 1933 |
| 1,934,287 | Westgate | Nov. 7, | 1933 |
| 2,016,424 | Friden | Oct. 8, | 1935 |
| 2,140,019 | Lewis | Dec. 13, | 1938 |
| 2,356,028 | Bullard | Aug. 15, | 1944 |
| 2,656,084 | Filander | Oct. 20, | 1953 |
| 2,670,705 | Herrold | Mar. 2, | 1954 |
| 2,762,544 | Davis | Sept. 11, | 1956 |
| 2,785,521 | Demski | Mar. 19, | 1957 |
| 2,791,317 | Cohrs | May 7, | 1957 |
| 2,803,840 | McShirley | Aug. 27, | 1957 |